US010300957B2

(12) United States Patent
Piper et al.

(10) Patent No.: US 10,300,957 B2
(45) Date of Patent: May 28, 2019

(54) VEHICLES AND VEHICLE ROOF STRUCTURES INCLUDING FRONT HEADER EXTENSIONS (71) Applicant: Toyota Motor Engineering & Manufacturing North America, Inc., Erlanger, KY (US)

(72) Inventors: Peter C. J. Piper, Saline, MI (US); Kuo Sun, Livonia, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 15/728,037

(22) Filed: Oct. 9, 2017

(65) Prior Publication Data

US 2019/0106156 A1 Apr. 11, 2019

(51) Int. Cl.
*B62D 25/06* (2006.01)
*B62D 27/02* (2006.01)
*B60J 1/00* (2006.01)
*B60J 1/02* (2006.01)

(52) U.S. Cl.
CPC .............. *B62D 25/06* (2013.01); *B60J 1/004* (2013.01); *B62D 27/02* (2013.01); *B60J 1/02* (2013.01)

(58) Field of Classification Search
CPC ........ B62D 25/06; B62D 27/02; B62D 25/02; B62D 25/04; B60J 1/004; B60J 1/02
USPC ....................... 296/210, 29, 187.13, 193.012
See application file for complete search history.

(56) References Cited

U.S. PATENT DOCUMENTS

| 4,252,364 | A | 2/1981 | Toyama et al. | |
|---|---|---|---|---|
| 8,894,136 | B2 | 11/2014 | Shono | |
| 8,960,775 | B2 | 2/2015 | Nagai et al. | |
| 9,126,632 | B2 | 9/2015 | Ono | |
| 9,394,018 | B2* | 7/2016 | Kisaku | B62D 25/02 |
| 2014/0070571 | A1* | 3/2014 | Hong | B60J 7/00 296/216.07 |
| 2014/0191539 | A1* | 7/2014 | Sato | B62D 25/06 296/210 |
| 2014/0225399 | A1* | 8/2014 | Ono | B62D 25/06 296/210 |
| 2014/0354012 | A1* | 12/2014 | Nagai | B62D 27/023 296/193.06 |
| 2015/0097395 | A1* | 4/2015 | Faruque | B62D 25/04 296/187.12 |
| 2016/0107701 | A1* | 4/2016 | Anegawa | B62D 27/023 296/193.06 |
| 2016/0214649 | A1* | 7/2016 | Emura | B62D 25/04 |
| 2018/0099698 | A1* | 4/2018 | Toyota | B62D 21/157 |

(Continued)

FOREIGN PATENT DOCUMENTS

JP 5470356 4/2014

*Primary Examiner* — Gregory A Blankenship
(74) *Attorney, Agent, or Firm* — Dinsmore & Shohl LLP (57) ABSTRACT A vehicle may include a pair of roof side rails that extend in a vehicle longitudinal direction, a front header that includes opposite outboard ends that span between the pair of roof side rails, and a front header extension coupled to and extending from one of the outboard ends of the front header. The front header extension may include a center emboss structure that extends outwardly from a base at a pair of center emboss ridgelines and the center emboss structure may be connected to one of the pair of roof side rails.

19 Claims, 5 Drawing Sheets (56) References Cited

U.S. PATENT DOCUMENTS

2018/0148102 A1\* 5/2018 Sato ................. B62D 21/157
2018/0170451 A1\* 6/2018 Terada ............... B60J 5/0415

\* cited by examiner

VEHICLES AND VEHICLE ROOF STRUCTURES INCLUDING FRONT HEADER EXTENSIONS

TECHNICAL FIELD

The present specification generally relates to vehicles and vehicle roof structures and, more specifically, to vehicles and vehicle roof structures having front header extensions including center emboss structures.

BACKGROUND

Vehicles generally include a roof header that extends across a width of a vehicle roof in between right and left roof side rails. The roof header may be an elongated reinforcement structure that extends across the width of the vehicle roof and is connected to the right and left side roof side rails at opposite ends. While the roof header may provide widthwise reinforcement to a vehicle body at the vehicle roof, it may be possible to incorporate additional features that increase the structural rigidity as well as provide additional surface area for welds.

Accordingly, a need exists for alternative vehicles and vehicle roof structures having front header extensions including center emboss structures that provide increased structural rigidity in a vehicle lateral direction.

SUMMARY

In one embodiment, a vehicle may include a pair of roof side rails that extend in a vehicle longitudinal direction, a front header that includes opposite outboard ends that span between the pair of roof side rails, and a front header extension coupled to and extending from one of the outboard ends of the front header. The front header extension may include a center emboss structure that extends outwardly from a base at a pair of center emboss ridgelines and the center emboss structure may be connected to one of the pair of roof side rails.

In another embodiment, a front header extension for a front header assembly may include a base, a center emboss structure that extends outwardly from the base at a pair of center emboss ridgelines, and a pair of side structures that extend outwardly at sides of the base at respective side ridgelines. The front header extension may be configured to couple to and extend from an outboard end of a front header. The center emboss structure and each of the side structures of the pair of side structures may be configured to connect to one of a pair of roof side rails.

In yet another embodiment, a method of connecting a front header to a roof side rail includes aligning a header connecting portion of a front header extension to an outboard end of the front header, aligning a rail connecting portion of the front header extension to the roof side rail, and welding a center emboss structure of the front header extension to the roof side rail, the center emboss structure extending outwardly from a base at a pair of center emboss ridgelines.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments disclosed herein describe vehicles and vehicle roof structures that include front header extensions. Generally, vehicles according to the present disclosure include a roof comprised of one or more roof panels and a pair of roof side rails that extend along opposite sides of the roof in a vehicle longitudinal direction. One or more lateral supports, such as a front header, may extend in a vehicle lateral direction to support the roof or roof panels. In some embodiments, the front header may extend substantially the entire width of the roof and couple to each of the roof side rails at opposite ends of the front header, forming a rigid construction. The front header may be coupled at the opposite ends to each of the roof side rails at a front header extension. The front header extensions may incorporate various features, such as center emboss structures with one or more center emboss ridgelines, to increase a compressive load capacity in the vehicle lateral direction. The various roof structures having front header extensions including center emboss structures with one or more center emboss ridgelines will be described in more detail herein with specific reference to the corresponding figures. The vehicles and vehicle roof structures include front header extensions including center emboss structures with one or more center emboss ridgelines described herein may have higher lateral load capacities and have reduced mass compared to structures without center emboss structures with comparable lateral load capacities, thus improving lateral load strength and reducing overall vehicle weight and improving fuel consumption.

As used herein, the term "vehicle longitudinal direction" refers to the forward-rearward direction of the vehicle (i.e., in the +/− vehicle X-direction as depicted). The term "vehicle lateral direction" refers to the cross-vehicle direction (i.e., in the +/− vehicle Y-direction as depicted), and is transverse to the vehicle longitudinal direction. The term "vehicle vertical direction" refers to the upward-downward direction of the vehicle (i.e., in the +/− vehicle Z-direction as depicted).

As used herein, "upper" and "above" are defined as the positive Z direction of the coordinate axis shown in the drawings. "Lower" and "below" are defined as the negative Z direction of the coordinate axis shown in the drawings. The terms "outboard" or "outward" as used herein refer to the relative location of a component with respect to a vehicle centerline. The terms "inboard" or "inward" as used herein refer to the relative location of a component in the direction opposite of "outboard" or "outward." Because the vehicle structures may be generally symmetrical about the vehicle centerline, the direction to which use of terms "inboard," "inward," "outboard" and "outward" refer may be mirrored about the vehicle centerline when evaluating components positioned along opposite sides of the vehicle.

Figure 1:
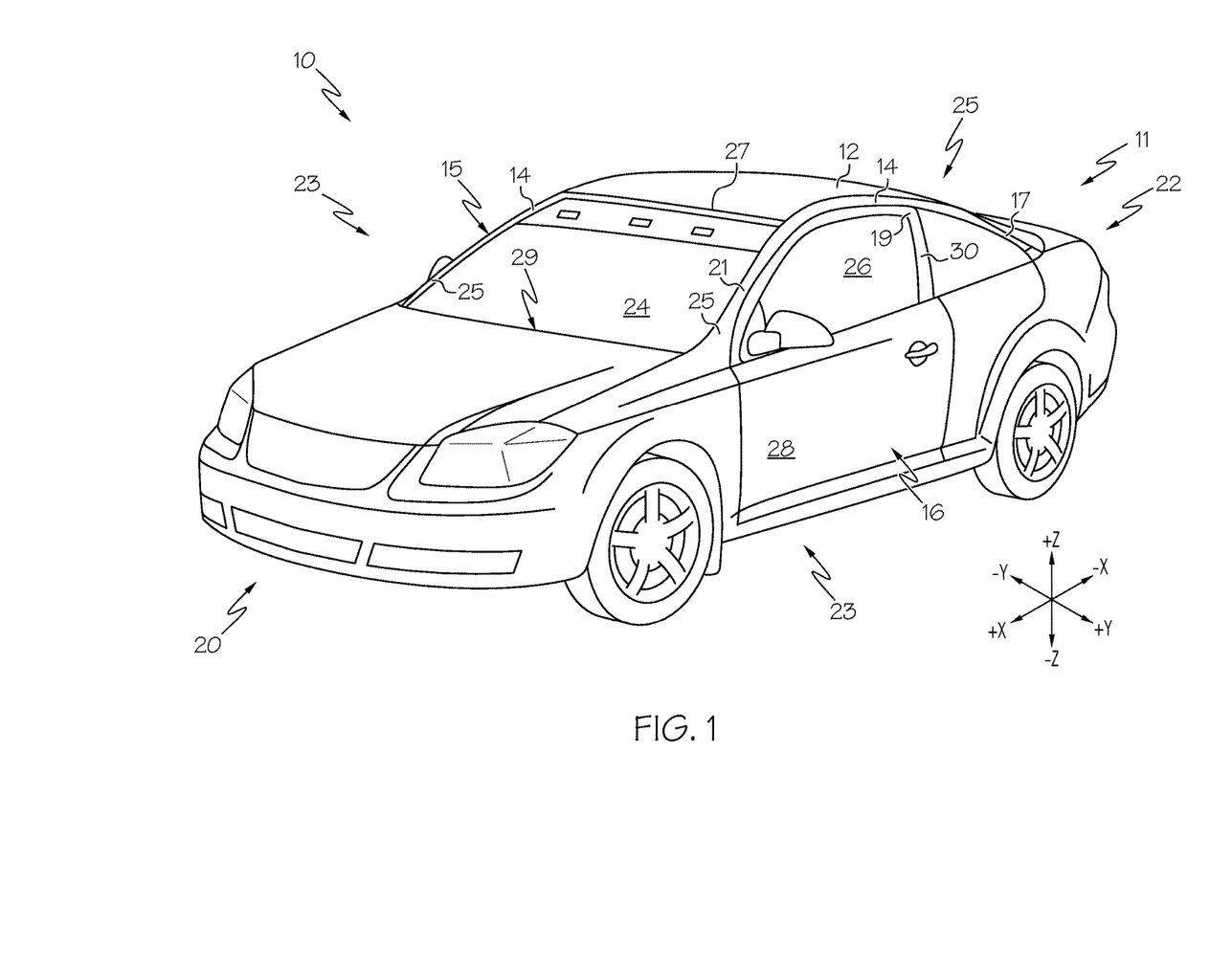
FIG. 1 schematically depicts a vehicle, according to one or more embodiments shown and described herein.

As depicted in FIG. 1, a vehicle 10 includes a roof 12, side rail assemblies 14, doors 16, a front end 20, a back end 22, and side portions 23. As shown, the vehicle 10 is a two-door vehicle which may be commonly referred to as a "coupe." However, embodiments are not so limited. Embodiments of the vehicle 10 are contemplated having one, two, three, four, five or any number of doors. Additionally, it is contemplated that the embodiments described herein may be used in any type of vehicle having a roof and side rails, such as, for example, a sedan, a truck, a sport utility vehicle (SUV), and the like. Even more, embodiments of the present disclosure are equally applicable to gasoline-powered vehicles, diesel-powered vehicles, hybrid-electric vehicles, electric vehicles, autonomous vehicles, driver-assisted vehicles, non-autonomous vehicles, and the like. Further, while an automobile is generally depicted, the vehicle 10 may be any passenger vehicle such as, for example, a terrestrial, aquatic, and/or airborne vehicle.

The vehicle 10 includes a vehicle body 11 including a vehicle framework 15 that includes the side rail assemblies 14 and various pillars. The various pillars are connected to the side rail assemblies 14 and extend downwardly therefrom in the vehicle vertical direction. These various pillars are generally referred to as C-pillars 17, B-pillars 19, and A-pillars 21. The A-pillars 21 are located at the vehicle forward end of the side rail assemblies 14 and may form a connection between the side rail assemblies 14 and the front end 20 of the vehicle framework 15. The C-pillars 17 are located at the vehicle rearward end of the side rail assemblies 14 and may form a connection between the side rail assemblies 14 and the back end 22 of the vehicle framework 15. The B-pillars 19 may be located along the side rail assemblies 14 between the A-pillars 21 and the C-pillars 17. The B-pillars 19 may form a connection between the side rail assemblies 14 and the side portion 23 of the vehicle framework 15 or the door 16.

Figure 2:
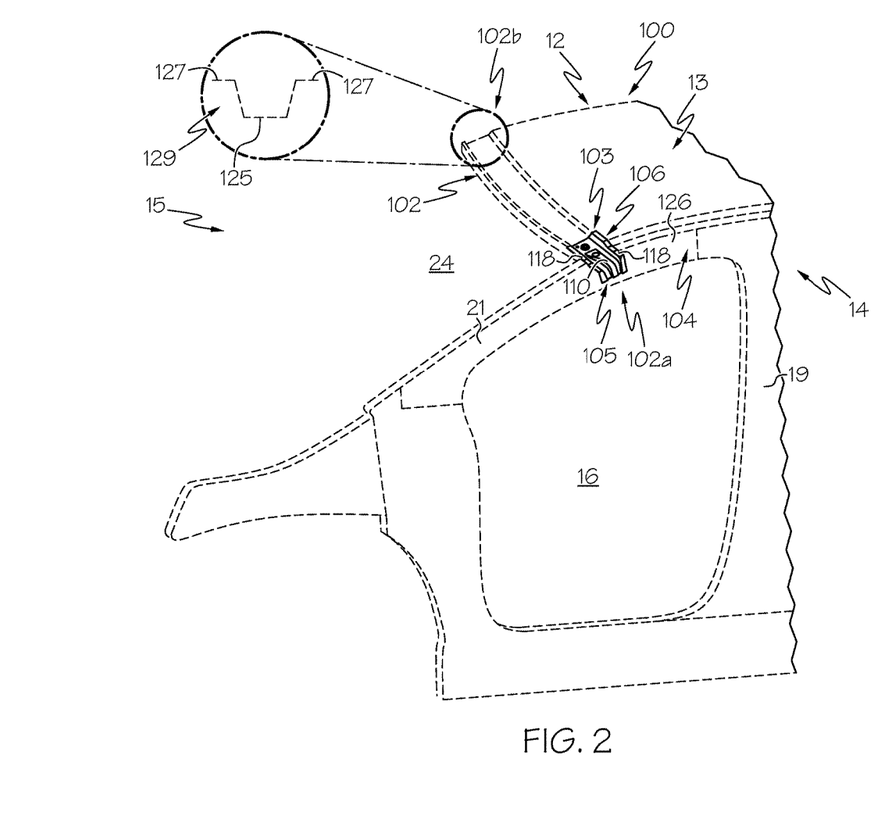
FIG. 2 schematically depicts an isometric view of the interior of the vehicle of FIG. 1 showing a right-side front header extension installed in a front header assembly of FIG. 2 that includes a front header that spans across the top of the vehicle of FIG. 1 and a roof side rail extending in the longitudinal direction coupled to the front header by the front header extension, according to one or more embodiments shown and described herein.

The roof 12 may have a solid exterior panel and may be constructed of and supported by one or more roof panels 13 (see FIG. 2). In turn, the roof panels 13 may be supported by one or more lateral supports. The roof panels 13 may be adhered to the one or more lateral supports by mastic or other adhesives or be welded to the lateral supports. The roof panels 13 may extend substantially across the width of the roof in the vehicle lateral direction and provide support and structure to the roof 12. The roof 12 and roof panels 13 may be made of a variety of materials including but not limited to sheet metal, fiberglass, and polycarbonate plastic.

The vehicle 10 may include one or more side windows 26, and a rear window 25. In some embodiments, the doors 16 include the side windows 26 and a door body 28. The side windows 26 may generally extend vertically between the door body 28 and the side rail assemblies 14 and in the vehicle longitudinal direction between the A-pillars 21 and the B-pillars 19. In some embodiments, the side windows 26 may be open and shut, such as, for example by lowering and raising the side windows 26 into and out of the door body 28.

Still referring to FIG. 1, the vehicle 10 may further include a windshield 24 that extends laterally between the A-pillars 21. The windshield 24 may also extend vertically from a cowl 29 upwardly to a roofline 27. The windshield 24 may be generally angled, along with the A-pillars 21 in the vehicle vertical direction toward the back end 22 of the vehicle 10 in the vehicle longitudinal direction. Together, the windshield 24 and the A-pillars 21 may gently curve from their generally angled orientation to blend with the roof 12 at the roofline 27. The roofline 27 may be formed and/or supported by one or more laterally extending members, such as, for example, a front header 102 as shown in FIG. 2.

FIG. 2 shows an interior portion of the right, outboard side of the vehicle framework 15 of the vehicle 10. The A-pillar 21, B-pillar 19, and C-pillar 17 are connected by the side rail assembly 14 which includes a roof side rail 104. The roof side rail 104 may form an interior portion of the side rail assembly 14. The door 16 is shown removed from the vehicle framework 15 for clarity.

To connect the right outboard side of the vehicle framework 15 with the left outboard side of the vehicle framework 15, the front header 102 may extend between the outboard sides of the vehicle framework 15. The front header 102 may take a generally arcuate shape, bending outward slightly convex in the vehicle forward direction. In some embodiments, the front header 102 is substantially straight. In some embodiments, the front header 102 extends in the vehicle lateral direction and is generally perpendicular with an axis that travels along the centerline of the vehicle 10 in the longitudinal direction of the vehicle. The front header 102 may have a cross-sectional shape that allows it to be nested (i.e., mated) with the one or more portions of a front header extension 106 as will be described in greater detail below. The front header 102 may form an interface between the windshield 24 and the one or more roof panels 13 of the roof 12, supporting the windshield 24 in the vehicle longitudinal direction. The front header 102 may lie in a plane that is substantially parallel with the plane of the roof 12.

As shown in the inset of FIG. 2, the front header 102 may have a profile shape 129 that is formed as a "U" or an upside-down hat formed by one or more front header side flange structures 127 and a front header base 125. The front header base 125 and the front header side flange structures 127 may be shaped and/or dimensioned to nest within corresponding portions of other components of the front header assembly for specific purposes, such as, for example, increasing the axial load capacity of the front header assembly 100. The profile shape 129 may extend the entire lateral dimension of the front header 102 (i.e., extending without interruption between two outboard ends, i.e., from a front header right outboard end 102a to a front header left outboard end 102b) or only across certain portions of the front header 102.

The roof side rail 104 may extend along the side of the vehicle 10 substantially in the vehicle longitudinal direction and along the external boundary of the roof 12. Briefly referring to FIG. 4, the roof side rail 104 may be comprised of an external rail panel 124 and an internal rail panel 126. Referring back to FIG. 2, in some embodiments, the roof side rail 104 generally takes the shape of an upper edge of the door 16 extending at least between the A-pillar 21 and the B-pillar 19 in the vehicle longitudinal direction. Additionally, the right and left roof side rails 104 may form the lateral boundaries of the windshield 24. The roof side rail 104 may be constructed from steel, plastic, composite material, or the like, or combinations thereof. Because the front header 102 may not extend completely between the roof side rails 104 of the vehicle framework 15, the front header extensions 106 may be used to permanently couple the front header 102 with the roof side rails 104. Some embodiments of the vehicle 10 may comprise a first front header extension and a second front header extension connected to the front header right outboard end 102a and the front header left outboard end 102b of the front header 102.

The front header extensions 106 may extend in the vehicle outward direction from the front header right outboard end 102a and the front header left outboard end 102b to the right and left roof side rails 104. To connect the front header 102 with the roof side rails 104, the front header extensions 106 may generally curve from an interface with the front header right outboard end 102a and the front header left outboard end 102b in the vehicle horizontal plane at a header connecting portion 103 to an interface with the roof side rail 104 in the vertical plane at a rail connecting portion 105.

Figure 5:
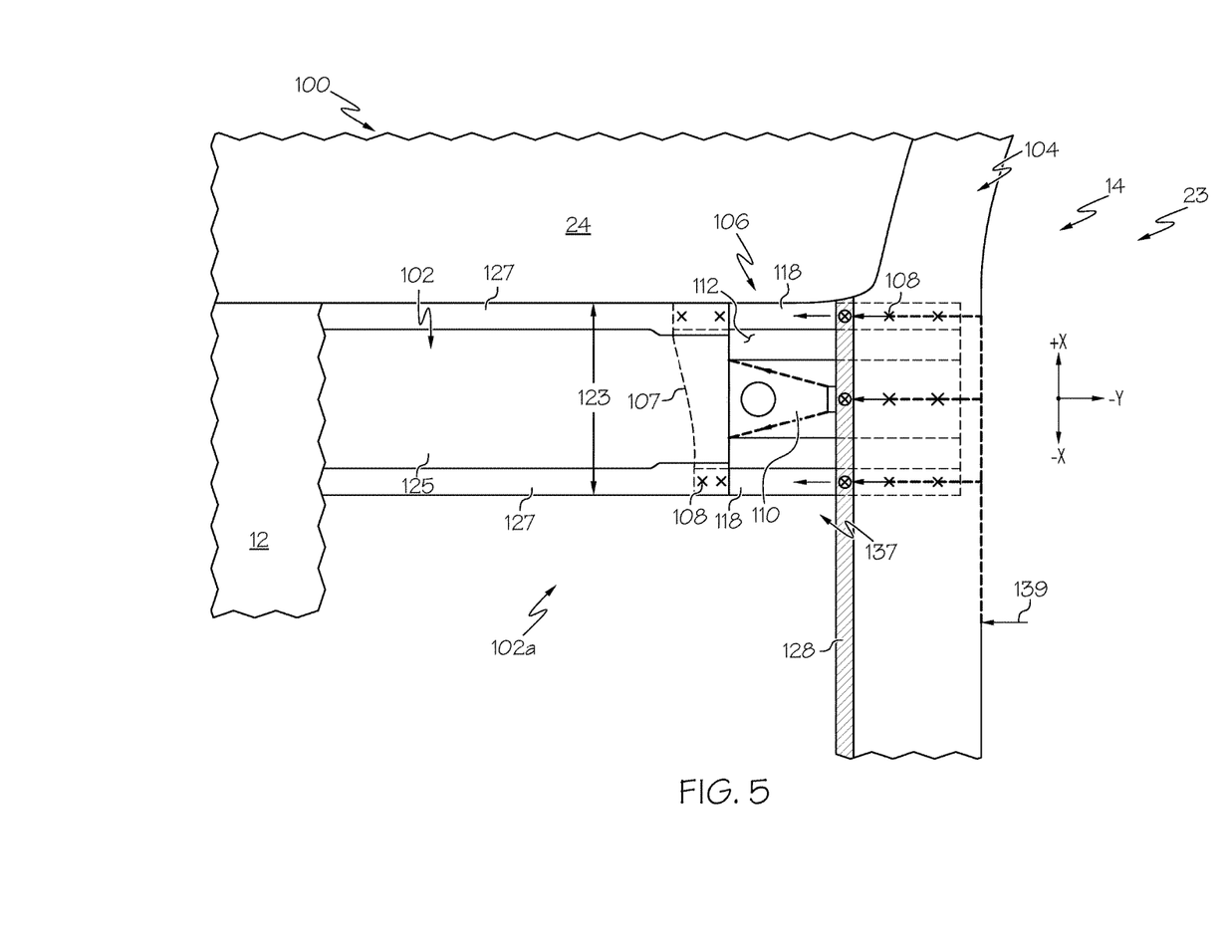
FIG. 5 schematically depicts a top view of the front header assembly for the vehicle of FIG. 1 including a front header spanning across a roof of the vehicle, a front header extension coupled to one end of the front header, according to one or more embodiments shown and described herein.

The header connecting portion 103 may lie generally in the horizontal plane of the vehicle 10 to interface with the front header 102. The front header 102 may be nested inside the front header extension 106 at the header connecting portion 103 along flat portions of the profile shape 129. The rail connecting portion 105 may slope downward in the vehicle vertical direction and outward in the vehicle lateral direction from the horizontal plane of the vehicle 10 to form an interface with the roof side rail 104 along external facing surfaces of the rail connecting portion 105. The connections may be permanently formed by one or more welds 108 (FIGS. 3B/5).

Figure 3A:
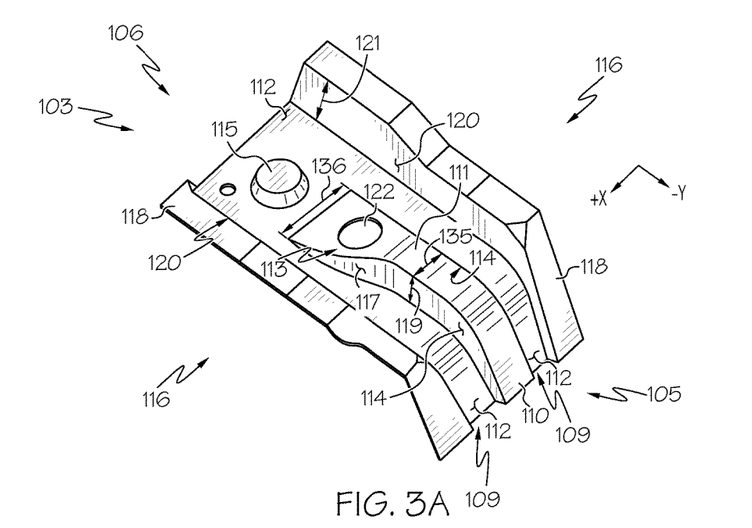
FIG. 3A schematically depicts the front header extension of FIG. 2 in isolation, according to one or more embodiments shown and described herein.
Figure 3B:
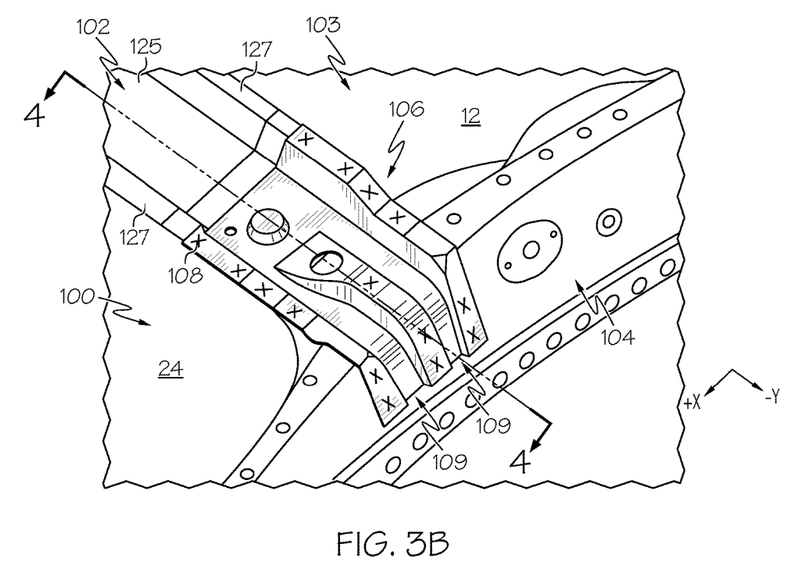
FIG. 3B schematically depicts the front header assembly including the front header extension of FIG. 3A connected to the roof side rail from inside the vehicle of FIG. 1, according to one or more embodiments shown and described herein.

FIGS. 3A and 3B show views of the front header extension 106 from an interior of the vehicle 10. The front header extension 106 includes a center emboss structure 110. The center emboss structure 110 extends outward from a base 112 of the front header extension 106 at one or more center emboss ridgelines 114. The center emboss ridgelines 114 are edge surfaces that extend upward from the base 112 in the vehicle vertical direction and alongside the center emboss structure 110 and form longitudinal boundaries of the center emboss structure 110. The base 112 may extend as a floor in the vehicle lateral direction between one or more sides 116 of the front header extension 106.

The sides 116 may comprise one or more side structures 118 as flanges that extend from the base 112 at one or more side ridgelines 120. The side ridgelines 120 are edge surfaces that extend in the vehicle vertical direction and in the vehicle lateral direction from the base 112 and form external boundaries of the base 112. The side ridgelines 120 may extend a side ridgeline height 121. As shown in FIG. 3B, when the front header 102 is nested within the header connecting portion 103 of the front header extension 106, the front header base 125 may correspond with the base 112 and be welded thereto and the one or more front header side flange structures 127 may correspond with the one or more side structures 118 and be welded thereto. The welds 108 shown in FIG. 3B are between the outboard facing sides of the surfaces of the front header extension 106 and their corresponding structures.

The difference in height between the center emboss structure 110 and the side structures 118 with the base may create two clearances 109 between the base 112 and the roof side rail 104. The two clearances 109 may provide space for conducting welds, such as welds 108.

Figure 4:
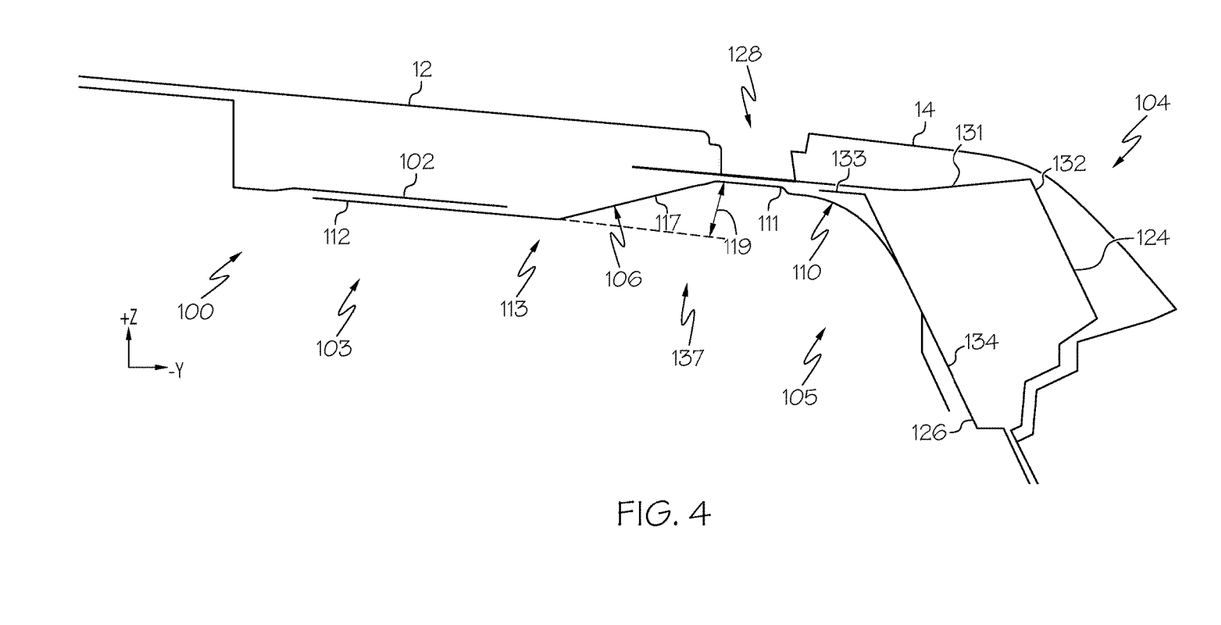
FIG. 4 schematically depicts a section view of the front header assembly including the front header extension and a raised portion thereof along line 4-4 of FIG. 3B, according to one or more embodiments shown and described herein.

Referring to FIGS. 3A, 3B and 4, in some embodiments, the center emboss structure 110 increases in distance away from the base 112 at a tapered portion 113 having one or more tapered ridgelines 117. The tapered ridgelines 117 may increase in height away from the base 112 in the vehicle vertical direction to a center emboss height 119. In some embodiments, the center emboss height 119 is sufficient such that a weld can be formed between the center emboss structure 110 and the roof side rail 104. In some embodiments, the center emboss height 119 includes the center emboss structure 110 and a raised portion 111.

Referring particularly to FIG. 4, the raised portion 111 is a portion of the center emboss structure 110 that protrudes in the vehicle vertical direction outward from the center emboss structure 110. The raised portion 111 provides a raised surface for a weld location between the roof side rail 104 and the front header extension 106. Such a weld may increase the lateral load capacity of the front header assembly 100 and by extension lateral load capacity of the vehicle framework 15 of the vehicle 10.

The center emboss structure 110 may vary in width as it increases in height in the vehicle outward direction. For example, as shown in the embodiment depicted in FIG. 3A, the center emboss structure 110 may decrease in width as it tapers up from the base 112 to the center emboss height 119 at the raised portion 111 from a base center emboss structure width 136 to a raised portion center emboss structure width 135. This decrease in width may provide structural advantages and/or make manufacturing of the front header extension simpler. The center emboss structure 110 may increase in width to provide space for one or more features of the center emboss structure 110, such as, for example, an auxiliary clearance 122.

The auxiliary clearance 122 may be removed from the front header extension 106 for providing clearance for various features of the roof structure, such as, for example, a front visor connection. The front header extension 106 may further include a temporary set pin 115 for temporarily holding and aligning the front header 102, roof side rails 104, and front header extension 106 upright and in place during construction before the welds 108 are completed.

FIG. 4 shows the front header extension 106 in profile from the line 4-4 shown in FIG. 3B. The front header extension 106 is shown bridging a gap 137 between the front header 102 and the roof side rail 104. In some embodiments the roof side rail 104 comprises the external rail panel 124 and the internal rail panel 126.

The external rail panel 124 may comprise an external rail upper portion 131 and an external rail side portion 132. The internal rail panel 126 may comprise an internal rail upper portion 133 and an internal rail side portion 134. Portions of the internal rail panel 126 and the external rail panel 124 may extend beyond the raised portion 111 in the vehicle inward direction. As shown in the embodiment depicted in FIG. 4, the external rail upper portion 131 extends inward beyond the raised portion 111 in the vehicle lateral direction. In some embodiments, the extension of the external rail upper portion 131 provides a surface to weld the raised portion 111 or other portions of the front header extension 106 to the roof side rail 104. Additionally, the internal rail side portion 134 may provide a surface to weld the roof side rail 104 to the external facing surfaces of the rail connecting portion 105 of the front header extension 106. Thus, the front header extension 106 may be coupled to one or more of the external rail panel 124 and the internal rail panel 126 along one or more portions of the center emboss structure 110, such as, for example, the raised portion 111 and welds at the header connecting portion 103 and the rail connecting portion 105.

In some embodiments, the raised portion 111 may be welded to the roof side rail 104 at a roof ditch welding flange 128. The roof ditch welding flange 128 may extend longitudinally along a length of the roof 12, between the roof 12 and the side rail assembly 14 forming an external interface therebetween.

FIG. 5 shows an exemplary axial load path for embodiments of the vehicle 10. The front header extension 106 connects the roof side rail 104 with the front header 102, bridging the gap 137 between the two structures. As seen in FIG. 5, the front header 102 may comprise a width 123 and a curved trim profile 107. The width 123 of the front header 102 may correspond to the width of the front header extension, such as, for example, in embodiments in which portions of the front header 102 are nested within the front header extension 106.

When a load 139 acts on a side portion 23 in the vehicle lateral direction, the load is imparted to the front header 102 through the various welds 108 between the roof side rail 104, the front header extension 106, and the front header 102. The load 139 causes a compressive stress in the vehicle lateral direction on the front header assembly 100. The load 139 is distributed between the welds 108 at the three surfaces in contact with the roof side rail 104 through the welds 108, that is, the side structures 118 and the center emboss structure 110. The greater distribution of the compressive forces may reduce the forces imparted on any particular surface, thereby increasing the total capacity for resisting a compressive force before deformation or failure of one or more components.

Front header assemblies including three structures with weld locations between the roof side rail 104 and the front header extension 106, such as the two side structures 118 and the center emboss structure 110 may demonstrate a compressive load capacity that is at least 11 kN greater than compressive load capacities of front header assemblies having only fewer structures with weld locations between the roof side rail 104 and the front header extension 106.

The front header extension 106 may be formed of steel, plastic, carbon fiber, composite, or any other suitable material or combination of suitable materials. The front header extension may comprise a single piece molded from a single material or may comprise multiple pieces. In some embodiments, the front header extension 106 may be constructed of an alloyed metal, such as, for example, a steel alloy. In some embodiments, the front header extension 106 is made from plastic or carbon fiber.

The one or more welds 108 may comprise spot welds or any other suitable type of weld. Processes for performing the welds may include, but are not limited to, fusion welding, solid-state welding, resistance welding, shielded metal arc welding (SMAW), gas tungsten arc welding (GTAW), or the like.

Referring back to FIG. 2, the axial load path for a compressive stress acting on the right side of the vehicle 10, inward in the vehicle lateral direction (+y) will now be described. When a load acts on the side of the vehicle 10, it is at least partially distributed to the front header 102 because of the permanent connection between the roof side rail 104 and the front header 102 through the front header extension 106. A load acting on the side of the vehicle imparts a compressive stress to the front header extension 106 and the welds 108 between the front header extension 106 and the roof side rail 104 in the vertical plane. The welds 108 in the horizontal plane between the front header extension 106 and the front header 102 are subject to a shear force.

The raised portion 111 of the center emboss structure 110 adds an additional weld location, thereby further dividing the shear force among the welds and reducing the shear force seen by any particular weld. Moreover, for front header extensions 106 having a center emboss structure, compressive forces acting on the front header extension 106 through the side structures 118 are decreased due to the addition of the center emboss structure 110 and the additional welds between the front header extension 106 and the internal rail panel 126. In a front header extension 106 without a center emboss structure 110, the side structures 118 may bear the entire load. Thus, front header extensions 106 with a center emboss structure 110 welded to the roof side rail 104 see a significant increase in the axial load capacity of the front header assembly 100. For example, front header extensions 106 having a center emboss structure 110 and one or more additional spot welds (as compared to structures in which no center weld is possible due to having no center emboss-like structure) may see an axial load capacity increase of up to 11 kN.

Based on the foregoing, it should be apparent that the vehicles and vehicle roof structures having front header assemblies including front header extensions as shown and described herein may have higher lateral load capacities and weigh less, thus providing increased structural rigidity in the vehicle lateral direction as well as improving lateral load capacity and reducing mass compared to structures without center emboss structures with comparable lateral load capacities thus reducing fuel consumption. Additionally, it should be understood that the foregoing describes a method of connecting a front header extension to a front header at a header connecting portion and to a roof side rail at a rail connecting portion.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:
1. A vehicle comprising:
   a pair of roof side rails that extend in a vehicle longitudinal direction;
   a front header comprising opposite outboard ends that spans between the pair of roof side rails; and a front header extension coupled to and extending from one of the outboard ends of the front header, the front header extension comprising a center emboss structure that extends outwardly from a base at a pair of center emboss ridgelines, the center emboss structure connected to one of the pair of roof side rails.

2. The vehicle of claim 1, wherein the front header extension further comprises a pair of side structures, each of the side structures of the pair of side structures comprising a side ridgeline that extends outwardly from the base.

3. The vehicle of claim 1, wherein the front header extension further comprises a raised portion extending outwardly from the center emboss structure toward the one of the pair of roof side rails.

4. The vehicle of claim 3, wherein the raised portion comprises a weld location welded to a portion of the one of the pair of roof side rails.

5. The vehicle of claim 3, wherein the center emboss structure comprises a tapered portion that decreases in height from the raised portion to the base.

6. The vehicle of claim 5, wherein the tapered portion decreases in width from the base to the raised portion.

7. The vehicle of claim 1, wherein the front header extension comprises a set pin for holding the front header extension to the one of the pair of roof side rails.

8. The vehicle of claim 1, wherein the front header extension comprises a header connecting portion and a rail connecting portion and the center emboss structure extends upward from the base at the header connecting portion to an emboss height and then curves in the vehicle vertical direction along the one of the pair of roof side rails at the rail connecting portion.

9. The vehicle of claim 8, wherein the emboss height is between 15 and 25 mm.

10. The vehicle of claim 1, wherein:
the front header extension is a first front header extension,
the vehicle further comprises a second front header extension extending from the opposite one of the outboard ends of the front header, and
the second front header extension comprises a second center emboss structure that extends outwardly from a second base at a second pair of center emboss ridgelines, the second center emboss structure connected to the opposite one of the pair of roof side rails.

11. A front header extension for a front header assembly comprising:
a base;
a center emboss structure that extends outwardly from the base at a pair of center emboss ridgelines; and
a pair of side structures that extend outwardly at sides of the base at respective side ridgelines; wherein
the front header extension is configured to couple to and extends from an outboard end of a front header and the center emboss structure and each of the side structures of the pair of side structures are configured to connect to one of a pair of roof side rails, wherein
the center emboss structure further comprises a raised portion extending outwardly from the center emboss structure toward the one of the pair of roof side rails.

12. The front header extension of claim 11, wherein the raised portion comprises a weld location located to weld to a portion of the one of the pair of roof side rails.

13. The front header extension of claim 11, wherein the center emboss structure comprises a tapered portion that decreases in height from the raised portion to the base.

14. The front header extension of claim 13, wherein the tapered portion decreases in width from the base to the raised portion.

15. The front header extension of claim 11, further comprising a set pin for holding the front header assembly to the one of the pair of roof side rails.

16. The front header extension of claim 11, further comprising a header connecting portion and a rail connecting portion and the center emboss structure extends upward from the base at the header connecting portion to an emboss height and then curves in the vehicle vertical direction at the rail connecting portion.

17. The front header extension of claim 16, wherein the emboss height is between 15 and 25 mm.

18. A method of connecting a front header to a roof side rail, the method comprising:
aligning a header connecting portion of a front header extension to an outboard end of the front header;
aligning a rail connecting portion of the front header extension to the roof side rail; and
welding a center emboss structure of the front header extension to the roof side rail, the center emboss structure extending outwardly from a base at a pair of center emboss ridgelines.

19. The method of claim 18, wherein the center emboss structure further comprises a raised portion and the raised portion comprises a weld location between the front header extension and the roof side rail.

* * * * *